United States Patent [19]
Kurokami et al.

[11] Patent Number: 5,838,148
[45] Date of Patent: Nov. 17, 1998

[54] POWER CONTROL METHOD AND APPARATUS FOR BATTERY POWER SUPPLY AND BATTERY POWER SUPPLY SYSTEM

[75] Inventors: Seiji Kurokami, Tsuzuki-gun; Kimitoshi Fukae, Nara; Nobuyoshi Takehara, Souraku-gun, all of Japan

[73] Assignee: Canon Kabushiki Kaisha, Tokyo, Japan

[21] Appl. No.: 703,800

[22] Filed: Aug. 28, 1996

[30] Foreign Application Priority Data

Aug. 29, 1995 [JP] Japan .................................. 7-242313

[51] Int. Cl.$^6$ .................................................. G05F 5/00
[52] U.S. Cl. ............................................ 323/299; 323/906
[58] Field of Search ............................. 323/220, 299, 323/906

[56] References Cited

U.S. PATENT DOCUMENTS

| | | | |
|---|---|---|---|
| 4,390,940 | 6/1983 | Corbefin et al. | 323/906 |
| 4,404,472 | 9/1983 | Steigerwald | 323/906 |
| 4,510,434 | 4/1985 | Assbeck et al. | 323/906 |
| 4,649,334 | 3/1987 | Nakajima | 323/299 |
| 4,794,272 | 12/1988 | Bavaro et al. | 307/66 |
| 5,268,832 | 12/1993 | Kandatsu | 323/906 |
| 5,327,071 | 7/1994 | Frederick et al. | 323/299 |

FOREIGN PATENT DOCUMENTS

| | | |
|---|---|---|
| 2175653 | 10/1973 | France . |
| 2903559 | 12/1980 | Germany . |
| 62-85312A | 4/1987 | Japan . |
| 6110571 | 4/1994 | Japan . |
| 6054452 | 7/1994 | Japan . |

*Primary Examiner*—Stuart N. Hecker
*Attorney, Agent, or Firm*—Fitzpatrick Cella Harper & Scinto

[57] ABSTRACT

Power supplied from a battery power supply to a load through a power conversion unit is maximized with a relatively simple arrangement and a small processing load. In addition, an output command value for controlling the power conversion unit is detected, a set voltage for which the output command value is maximized is calculated with reference to a past or present set voltage, as needed, and set as the next set voltage such that the maximum output is supplied to the load without any erroneous operation in the case of variation in solar radiation. In this case, a plurality of voltages are sequentially set for a relatively short period. Output command values for the respective set voltages are fetched while setting the same voltage at the start and end of the operation. A variation in output command value caused by the fetching difference for the same set voltage is detected. The output command value for calculating the next set voltage is corrected in accordance with this variation.

44 Claims, 7 Drawing Sheets

POWER CONTROL METHOD AND APPARATUS FOR BATTERY POWER SUPPLY AND BATTERY POWER SUPPLY SYSTEM

BACKGROUND OF THE INVENTION

The present invention relates to a power control method and apparatus applied to an apparatus having a power conversion means, and a battery power supply system to which the method or apparatus is applied and, more particularly, to a power control method and apparatus and a power supply system, which enable to increase an output from a battery power supply.

As awareness of the terrestrial environment grows, power supply systems including a solar power generation system and a wind power generation system are largely expected because of their capability of providing a clean energy. For example, when a solar cell is used as a battery power supply and connected to a conventional commercial AC system, the commercial AC system can be regarded as an infinite load, so that extra power can be traded. Considering trading of extra power, the battery power supply system is required to most efficiently operate as a whole. Even when only the efficiency of the battery power supply is increased, the utilization efficiency is lowered as a whole as far as the efficiency of the battery power supply system is low. Therefore, an increase in efficiency of the entire system is required. Particularly, an output from a solar cell using a photoelectric conversion element largely varies depending on the solar radiation, the temperature, the operating point voltage, and the like. For this reason, the load with respect to the solar cell must be adjusted to always extract the maximum power from the solar cell.

Conventionally, the voltage or current at the operating point of the solar cell is detected on the input side of the power conversion unit for converting the output from the solar cell into power and feeding the power to the load. The output power from the solar cell is easily calculated by multiplication, and the operating point is controlled such that the calculated output power is maximized. For example, Japanese Patent Laid-Open No. 62-85312 discloses a method in which the output voltage from the solar cell is changed, and the voltage reference is changed in a direction of increasing the detection value of the output power from the solar cell.

In another method, the operating voltage of the solar power generation system is changed, and output power from the power conversion unit connected to the solar cell to perform power conversion and feed the power to the load is detected. The direction of changing the operating voltage is determined in accordance with an increase/decrease in the power detection value of the output from the power conversion unit (e.g., Japanese Patent Publication No. 6-54452). Alternatively, the output current from the power conversion unit is detected, and the direction of changing the operating voltage is determined in accordance with an increase/decrease in current detection value of the output from the power conversion unit (e.g., Japanese Patent Laid-Open No. 6-110571). With these methods, the output power from the power conversion unit is controlled to be maximized.

However, the above methods have the following problems to be solved.

In the method in which the voltage and current of the solar cell are detected, and the output power from the solar cell is calculated such that control is performed to maximize the output power from the solar cell, the conversion efficiency of the power conversion unit changes in accordance with the input voltage to the power conversion unit. Therefore, even when the output power from the solar cell is maximized, the power converted and output from the power conversion unit is not always maximized.

In the method in which the output power from the power conversion unit is detected such that control is performed to maximize the detection value, a considerably large processing capability is required to calculate the output power when the output power from the power conversion unit is AC power.

Similarly, in the method in which the output current from the power conversion unit is detected such that control is performed to maximize the detection value, the load on the unit is increased, though it is smaller than the load in output power calculation, when the output current from the power conversion unit is an AC current.

In addition, when the solar radiation varies, the conventional power control methods cause an erroneous operation. Therefore, the operating point may be largely deviated from the optimum operating point, resulting in a decrease in conversion efficiency.

SUMMARY OF THE INVENTION

It is an object of the present invention to provide a power control method which allows an entire system to operate at the maximum efficiency such that power supply from a power conversion unit to a load is maximized, and the processing load for maximum power control is small.

It is another object of the present invention to provide a power control method which prevents the conversion efficiency from being decreased by deviation from a point near an operating point at which output power from a power conversion unit is maximized, without any erroneous operation even in the case of variation in solar radiation.

It is still another object of the present invention to provide a power control method for an apparatus having a battery power supply, power conversion means for converting power from the battery power supply and supplying the power to a load, voltage setting means for setting an output voltage from the battery power supply, and voltage control means for controlling an output command value to the power conversion means such that a voltage value of the battery power supply becomes a set voltage, comprising setting a voltage to be subsequently set on the basis of the output command value for a first period, e.g., a past or present period, and/or the set voltage for the first period.

It is still another object of the present invention to provide a power control method for an apparatus having a battery power supply, power conversion means for converting power from the battery power supply and supplying the power to a load, voltage setting means for setting an output voltage from the battery power supply, and voltage control means for controlling an output command value to the power conversion means such that a voltage value of the battery power supply becomes a set voltage, comprising the steps of changing the set voltage of the battery power supply to fetch the output command value for each set voltage, calculating a variation in output command value caused by a fetching difference on the basis of a plurality of fetched output command values for the same set voltage, calculating a corrected output command value on the basis of the variation and the output command values, and setting a voltage on the basis of the corrected output command value or the corrected output command value and the set voltage. Preferably, in the power control method, the output command value fetching step further comprises the step of setting the same set voltage before and after one or a plurality of set voltages to fetch (sample) the output command value for each set voltage, and the variation calculation step further comprises the step of calculating the variation on the basis of at least two of the output command values for the same set voltage, of the output command values for the respective set voltages.

It is still another object to provide a power control apparatus having power conversion means for converting power from a battery power supply and supplying the power to a load, voltage setting means for setting an output voltage from the battery power supply, and voltage control means for controlling an output command value to the power conversion means such that a voltage value of the battery power supply becomes a set voltage, wherein the voltage setting means has a function of calculating a voltage to be subsequently set on the basis of the output command value for a first period and/or the set voltage for the first period.

It is still another object of the present invention to provide a battery power supply system having a battery power supply, power conversion means for converting power from the battery power supply and supplying the power to a load, voltage setting means for setting an output voltage from the battery power supply, and voltage control means for controlling an output command value to the power conversion means such that a voltage value of the battery power supply becomes a set voltage, wherein the voltage setting means calculates and sets a voltage on the basis of the output command value and the set voltage.

According to the present invention for achieving the above objects, the output command value input to the power conversion means is controlled to be maximized, and power proportional to the output command value is output from the power conversion means. As a result, the maximum power is supplied from the power conversion unit to the load, so that the entire system is operated at the maximum conversion efficiency. Even when the output power from the power conversion unit is AC power, the output command value is a DC signal in the control system, so that the load can be much smaller than that in calculation using an AC power value or an AC current value.

In addition, according to the present invention, the output command value input to the power conversion unit is detected. A variation at the time of detection is estimated on the basis of the output command value for the same set voltage, and the output command value is corrected. With this arrangement, data corresponding to a set voltage vs. output command value characteristic curve at the same time can be obtained, so that the operating point at which power output from the power conversion unit is maximized without being influenced by the variation in solar radiation can be searched. Moreover, by performing the sampling operation twice for the same voltage, the variation is estimated with a smaller number of sampling operations to correct the data. Therefore, the operating point at which the maximum output can be obtained can be searched at a higher speed. Furthermore, when the sampling operation for the same voltage is performed at the start and end of the sampling operation, information including the variation in solar radiation from the start to the end of the sampling operation is detected, so that data correction can be more accurately performed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

The present invention will be described below in detail with reference to the accompanying drawings.

Figure 1:
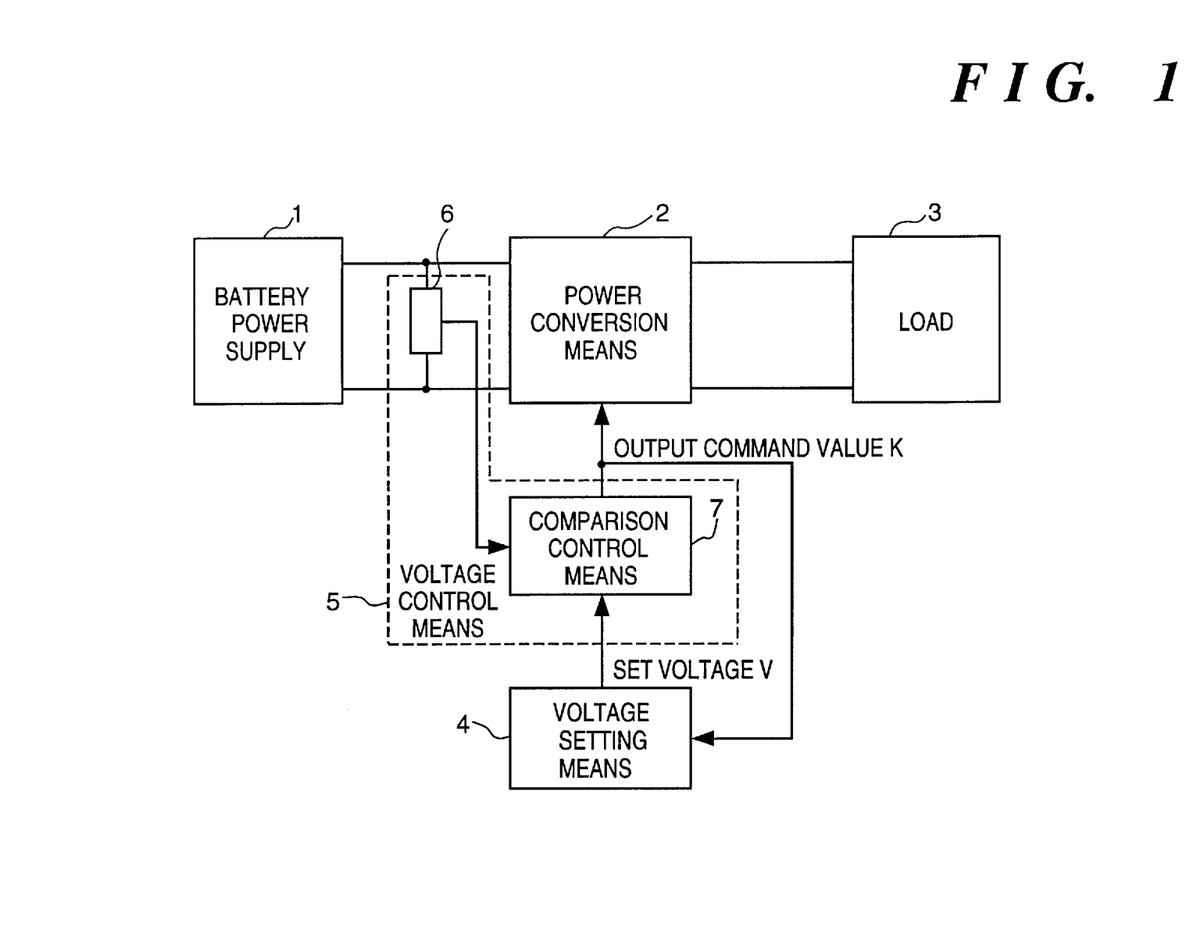
FIG. 1 is a block diagram showing an example of a battery power supply system to which a power control method of the present invention can be applied.

FIG. 1 is a block diagram showing the arrangement of a solar power generation system using a power control method according to a preferred embodiment (first embodiment) of the present invention.

Referring to FIG. 1, reference numeral 1 denotes a battery power supply; 2, a power conversion means; 3, a load; 4, a voltage setting means; 5, a voltage control means; 6, a voltage detection means; and 7, a comparison control means. The DC power of the solar cell 1 serving as a battery power supply is subjected to power conversion by the power conversion means 2 and supplied to the load 3.

As the battery power supply 1, a solar cell using amorphous silicon, crystallite silicon, or polysilicon, as a non-monocrystalline semiconductor, monocrystalline silicon, or a compound semiconductor can be used. Normally, a plurality of solar cell modules are serially or parallelly combined to constitute an array such that a predetermined voltage and current can be obtained.

As the power conversion means 2, a DC/DC converter using a self-arc-extinguishing switching device such as a power transistor, a power MOSFET, or an IGBT, or a self-excited voltage DC/AC inverter can be used. The power conversion means 2 can control the power flow, the input/output voltage, the output frequency, and the like by changing the ON/OFF duty ratio of a gate pulse.

As the load 3, an electric heating load, a motor load, a commercial AC system, or a combination thereof can be used. When the load is a commercial AC system, the solar power generation system is called a system linkage solar power generation system. Since power supplied to the system is not limited to a specific one, the power control method of the present invention which supplies a high power from the battery power supply can be suitably applied to this system.

The voltage setting means 4 performs calculation upon receiving an output command value, thereby determining the set voltage. The voltage setting means 4 is realized by a control microcomputer and has a CPU, a RAM, a ROM, I/O ports, and the like.

The voltage control means 5 is constituted by the voltage detection means 6 and the comparison control means 7. The voltage detection means 6 divides the output voltage from the battery power supply 1 by a resistor, converts the voltage value into a digital value by A/D conversion, and sends the digital value to the comparison control means 7. The comparison control means 7 receives the voltage value detected by the voltage detection means 6 and the set voltage output from the voltage setting means 4 and controls the output command value such that the voltage values match each other. The comparison control means 7 is realized by a CPU, a RAM, a ROM, I/O ports, and the like, which can be shared by the voltage setting means 4. In this case, the arrangement is simplified.

The power conversion means 2 generates a switching device driving pulse by triangular wave comparison or instantaneous current tracking control in accordance with the output command value from the voltage control means 5 to turn on/off the switching device, thereby performing a power conversion operation. The voltage control means 5 and the power conversion means 2 perform feedback control, so that the output voltage from the battery power supply 1 is controlled to match the set voltage.

Figure 2:
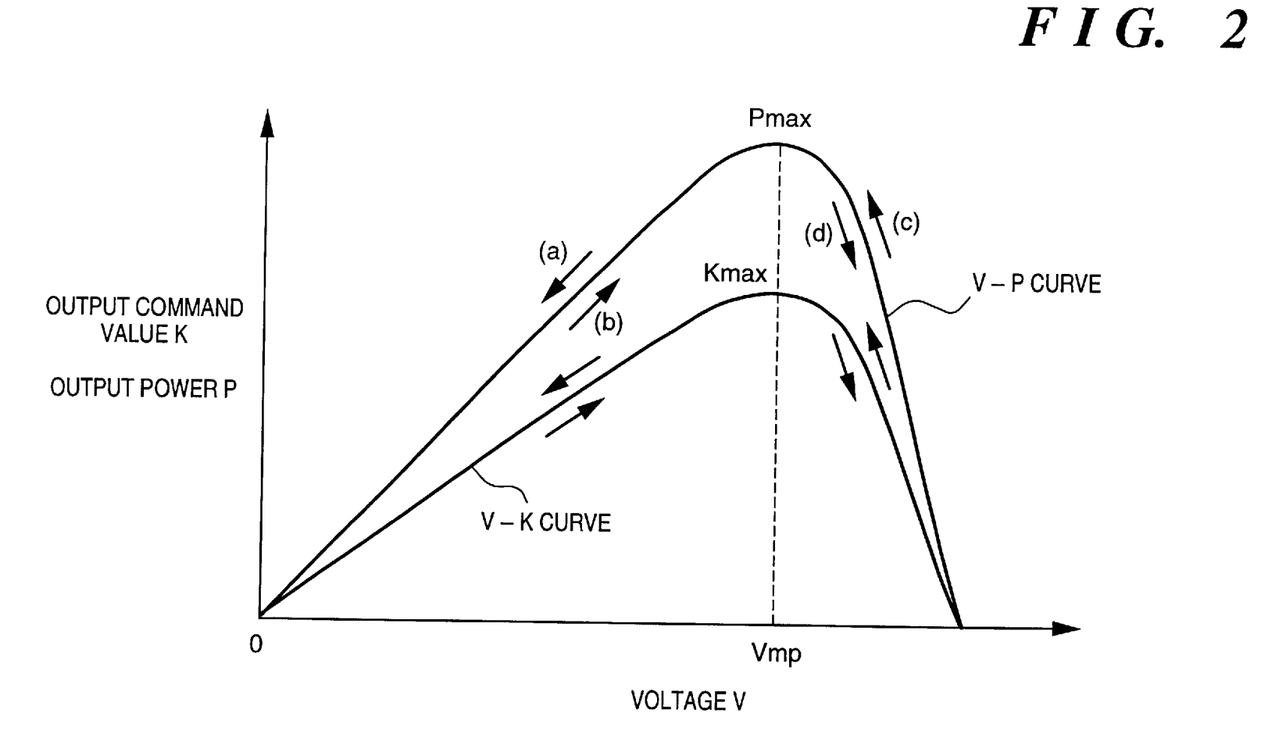
FIG. 2 is a graph showing the relationship between a solar cell voltage, an output command value, and output power of a power conversion means, and a preferred embodiment of an optimum operating point searching operation.

FIG. 2 is a graph showing an example of characteristic curves, in which the output voltage from the solar cell is plotted along the abscissa, and the output command value and the output power of the power conversion means 2 are plotted along the ordinate. The power supplied from the power conversion means 2 to the load 3 changes in proportion to the output command value, as shown in FIG. 2. As the output command value becomes large, a higher power is supplied from the power conversion means 2. When the output voltage of the battery power supply 1 is a value Vmp at which the output power of the power conversion means 2 is a maximum value Pmax, the output command value is a maximum value Kmax. Therefore, when a set voltage for maximizing the output command value is set, the power supplied from the battery power supply 1 to the load 3 through the power conversion means 2 is maximized.

An operation of searching an operating point at which the maximum power is supplied from the power conversion means 2 will be described below in more detail.

Figure 3:
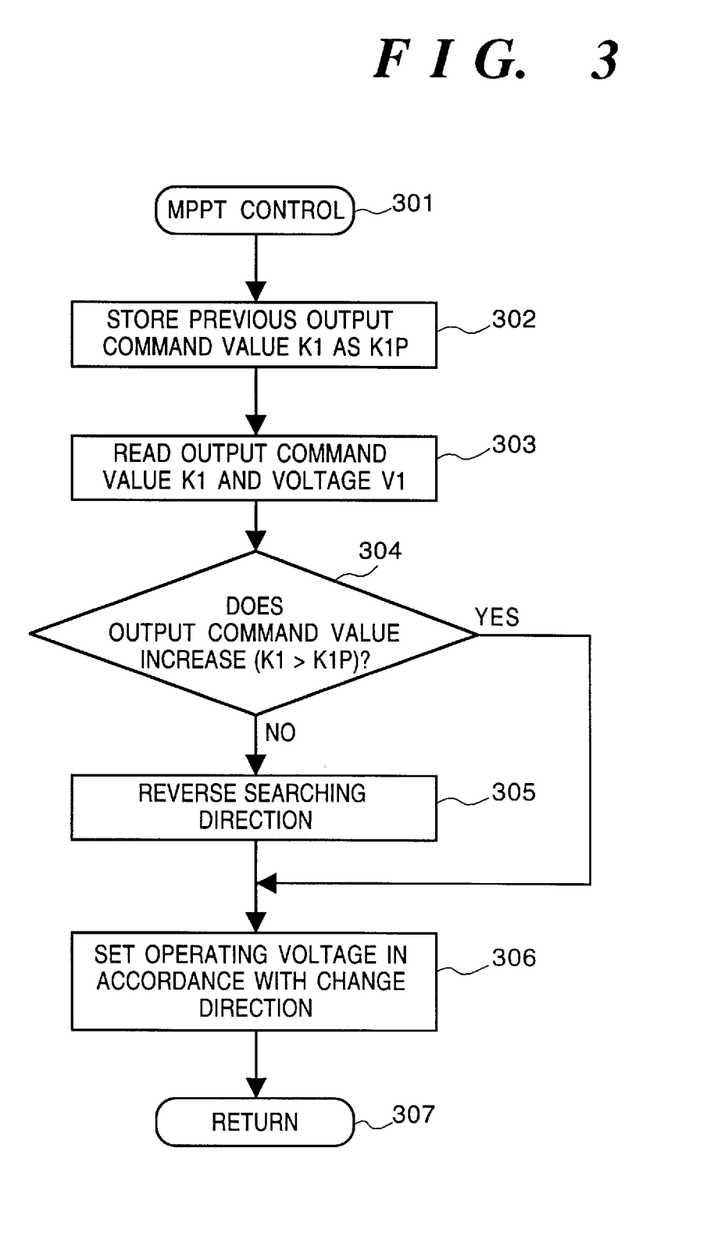
FIG. 3 is a flow chart showing a control operation in FIG. 2.

The voltage setting means 4 fetches the output command value and compares it with a previous output command value. When the output command value increases, a voltage to be subsequently set is changed in the same direction as in the previous operation. More specifically, when the set voltage is increased in the previous operation (mode (b) in FIG. 2), the set voltage is also increased in the next operation. If the set voltage is decreased in the previous operation (mode (c) in FIG. 2), the set voltage is decreased in the next operation. When the output command value decreases, the set voltage to be subsequently set is changed in a direction opposite to that in the previous operation. That is, if the set voltage is increased in the previous operation (mode (d) in FIG. 2), the set voltage is decreased in the next operation, and if the set voltage is decreased in the previous operation (mode (a) in FIG. 2), the set voltage is increased in the next operation. The voltage set in this manner is output. FIG. 3 is a flow chart showing an example of this operation.

As shown in FIG. 3, when MPPT (Maximum Power Point Tracking) control is performed (301), a previous output command value K1 is stored as K1P (302). A new output command value K1 and a voltage V1 are read (303).

Subsequently, the output command values K1 and K1P are compared with each other to check a variation in output command value. In this case, it is determined whether the output command value increases (304). If the output command value does not increase (i.e., if NO in 304), the searching direction is reversed, i.e., the direction of changing the output command value is reversed (305). After the searching direction is reversed, or if the output command value increases (i.e., if YES in 304), the operating voltage is set in accordance with the change direction and the previous operating voltage (306). This operation is repeatedly performed (307).

The above operation is repeatedly performed at a predetermined period, and the voltage of the battery power supply 1 is controlled such that the power supplied from the power conversion means 2 to the load 3 is maximized.

As described above, when the direction of changing the set voltage is determined such that the output command value increases when the set voltage varies, control is performed to supply the maximum power from the power conversion means 2 to the load 3. Therefore, the entire system is operated at the maximum conversion efficiency.

Second Embodiment

Another embodiment (second embodiment) of the present invention will be described below.

Figure 4:
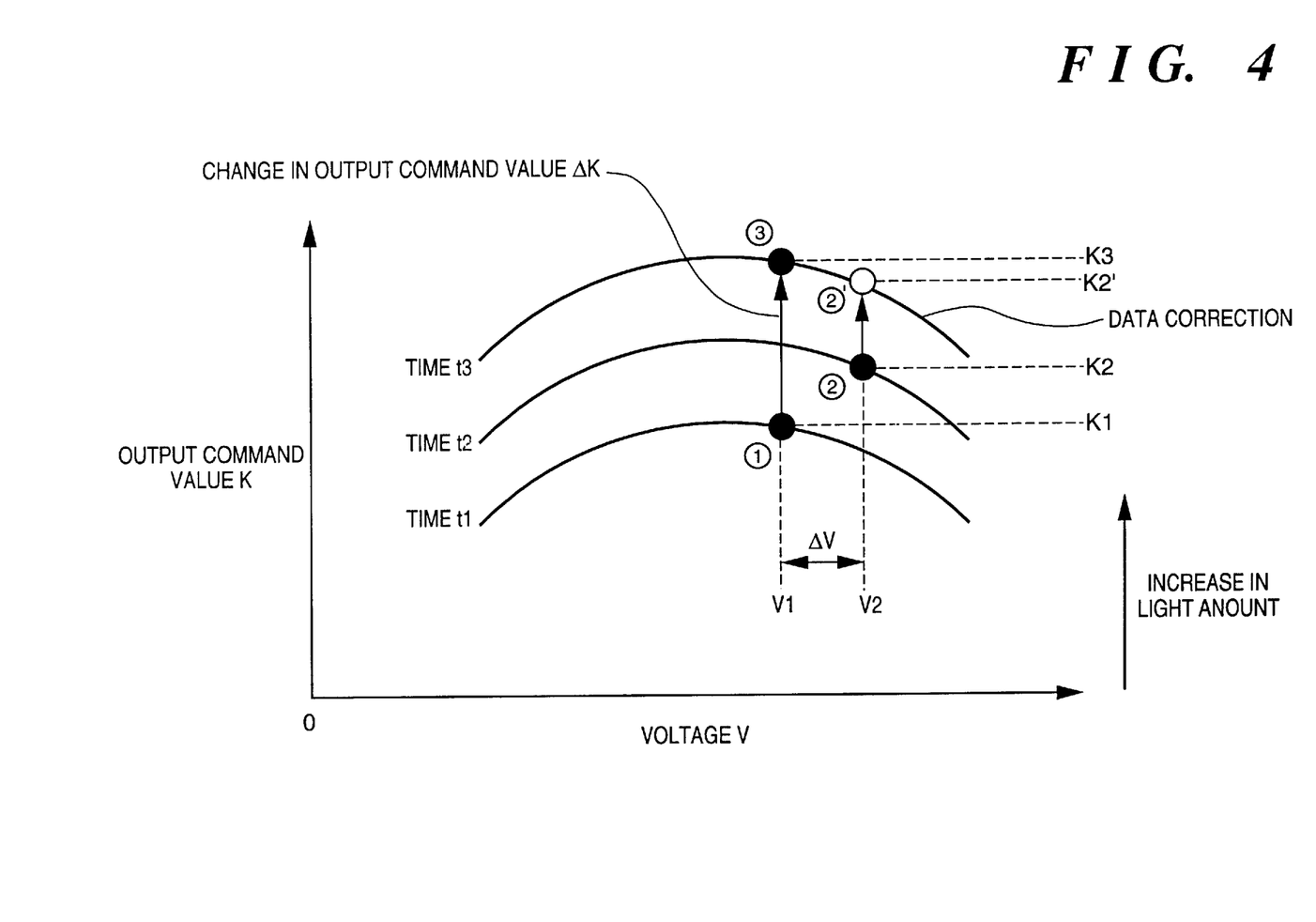
FIG. 4 is an explanatory view showing another preferred embodiment of the optimum operating point searching operation of the power control method of the present invention.

A solar power generation system using a power control method of the second embodiment has an arrangement as shown in FIG. 1, as in the first embodiment. A power control system different from the first embodiment will be described below with reference to FIG. 4. FIG. 4 is a graph showing characteristic curves at various times, in which the output voltage from a solar cell serving as a battery power supply 1 is plotted along the abscissa, and the output command value is plotted along the ordinate.

Figure 5:
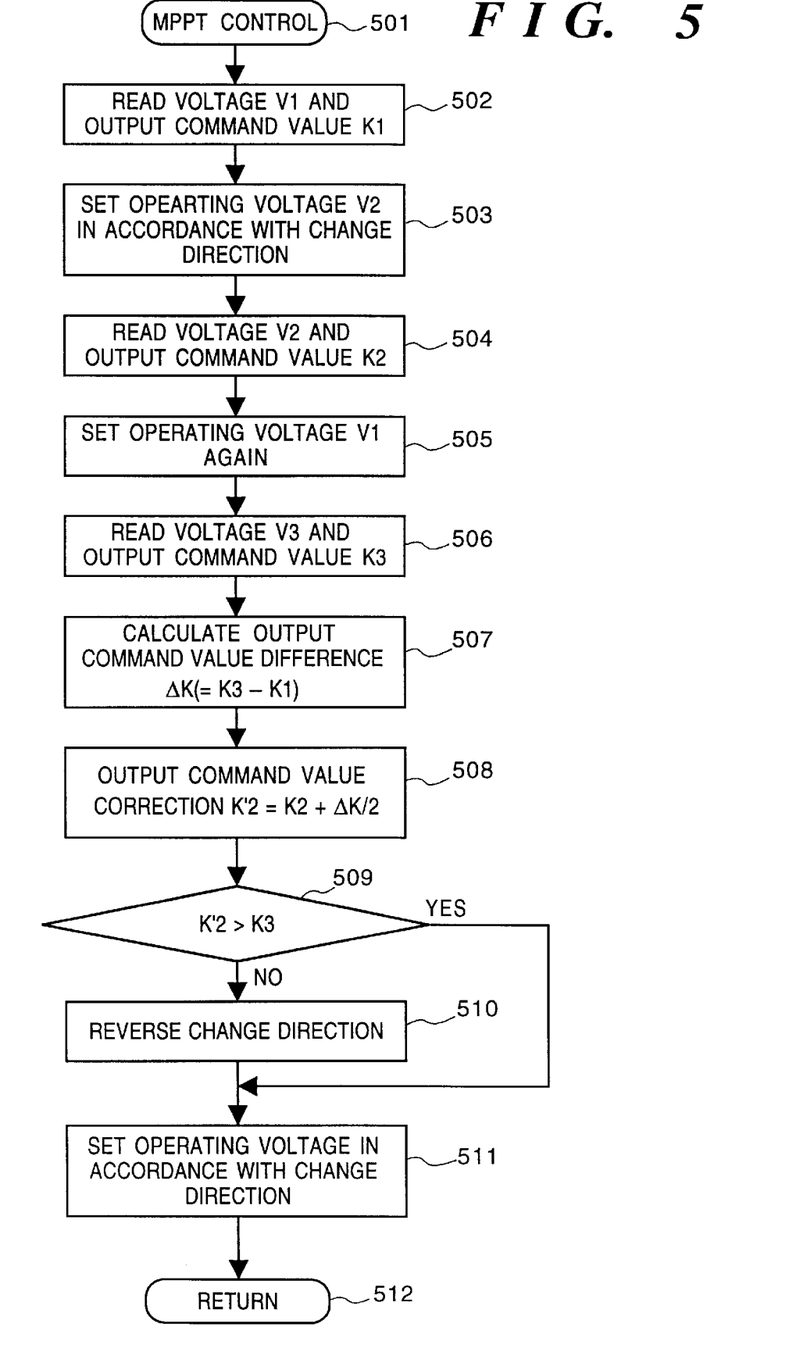
FIG. 5 is a flow chart showing a control operation in FIG. 4.

FIG. 5 is a flow chart showing an operation to be described below.

A set voltage is defined as V1 first. Control is performed by a voltage control means 5 such that the output voltage from the battery power supply 1 becomes the set voltage. At time t1, sampling is performed to fetch the output voltage V1 from the battery power supply 1 and an output command value K1 at an operating point ① (502).

operating point ①: voltage V1, output command value K1

Subsequently, a set voltage is defined as V2 (=V1+ΔV) (503). Control is performed by the voltage control means 5 such that the output voltage from the battery power supply 1 becomes the set voltage. At the next sampling time t2 (=t1+Ts), the output voltage V2 and an output command value K2 at an operating point ② are fetched (504).

operating point ②: voltage V2, output command value K2

The set voltage is defined as V1 again (505). The output voltage is controlled by the voltage control means 5. At the next sampling time t3 (=t2+Ts), an output voltage V3 (=V1) and an output command value K3 at an operating point ③ are fetched (506).

operating point ③: voltage V3, output command value K3

The variation in solar radiation is estimated on the basis of the difference between the output command values for the same set voltage value V1. When the solar cell output voltage does not change, the variation in output power of the solar cell is almost proportional to the variation in solar radiation. The output power of a power conversion means 2 is almost proportional to the input power. In addition, the output command value is proportional to the output power of the power conversion means 2. For this reason, the variation in output command value is almost proportional to the variation in solar radiation. The output power and output command value of the power conversion means 2 are also almost proportional to the variation in solar radiation as far as the input power varies only for a short period corresponding to the sampling period. Therefore, the difference between the output command values for the same voltage is information representing the change amount of solar radiation for that period of time. That is, the difference between the output command values, i.e., ΔK=K3=K1 represents the change amount of solar radiation from time t1 to time t3. The difference ΔK is calculated (507).

The output command value K2 is corrected using the difference ΔK, i.e., information representing a change in solar radiation (508).

The normal sampling period Ts is as short as about 1/30 sec, so that the change rate of solar radiation from time t1 to time t3 can be regarded as constant. Near the operating point at which the maximum output can be obtained, the difference between the output command values for the voltages V1 and V2 is small. Therefore, the rate of change in output command value caused by the variation in solar radiation for a period corresponding to the sampling period Ts can be regarded as constant for the voltages V1 and V2.

To correct the output command value K2 for the voltage V2 at time t2 to an output command value K2' for the voltage V2 at time t3, a change amount ΔK/2 of the output command value, which corresponds to the change mount of solar radiation from time t2 to time t3, must be added to the output command value K2:

$$K2'=K2+\Delta K/2$$

This corrected operating point is indicated by ②' in FIG. 4.

operating point ②': voltage V2, output command value K2'The output command values at the operating points ③ and ②' are compared with each other, thereby determining the next searching direction. More specifically, since the output command value K3 at the operating point ③ is larger than the output command value K2' at the operating point ②', the operating point at which the output command value, i.e., the operating point at which the maximum power can be obtained is smaller than that for the operating voltage V1. Therefore, the next searching direction, i.e., the voltage change direction is determined as "decrease". That is, K2'>K3 is determined (509), and the change direction is reversed in accordance with the determination result (510) as needed (i.e., if NO in 509). Thereafter, the operating voltage is set in accordance with the change direction and the previous operating voltage.

By repeating the above operation, the operating point at which the maximum power can be supplied from the power conversion means 2 can be tracked.

A case wherein the light amount increases has been described above. However, as can be easily understood, even when the light amount decreases or does not change, the operating point at which the maximum power can be obtained is tracked.

As described above, when the variation in solar radiation is estimated on the basis of the output command values for the same voltage to correct the data, data corresponding to the same voltage vs. output command value characteristic curve at the same time can be obtained. On the basis of this data, the searching direction is determined. With this operation, control is performed such that the maximum power is supplied from the battery power supply 1 to a load 3 through the power conversion means 2 without any erroneous operation of the search control algorithm caused by the variation in solar radiation. The entire system is most efficiently operated, and an unstable operation of the system is suppressed.

Third Embodiment

Still another embodiment (third embodiment) of the present invention will be described below.

Figure 6:
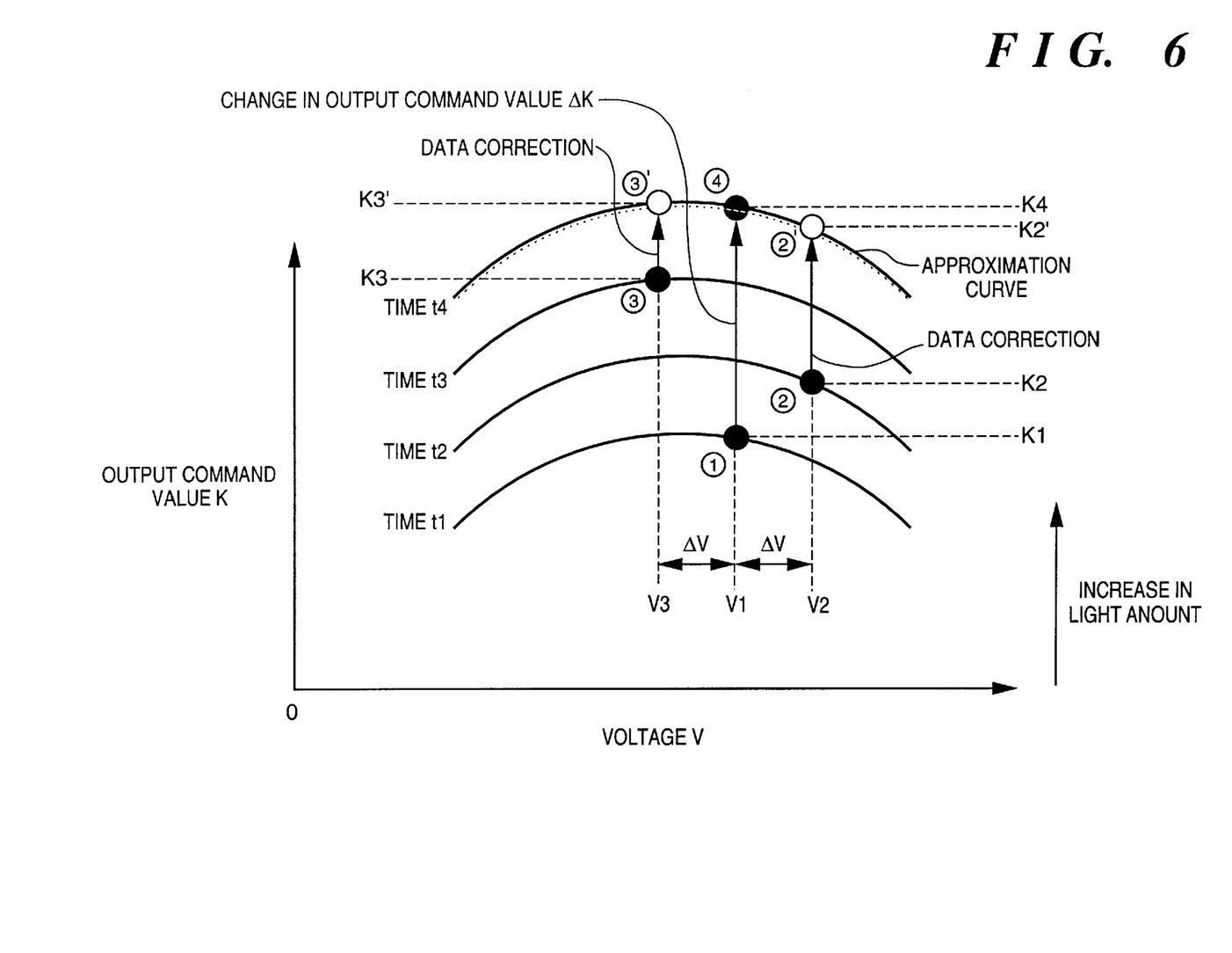
FIG. 6 is an explanatory view showing still another preferred embodiment of the optimum operating point searching operation of the power control method of the present invention.
Figure 7:
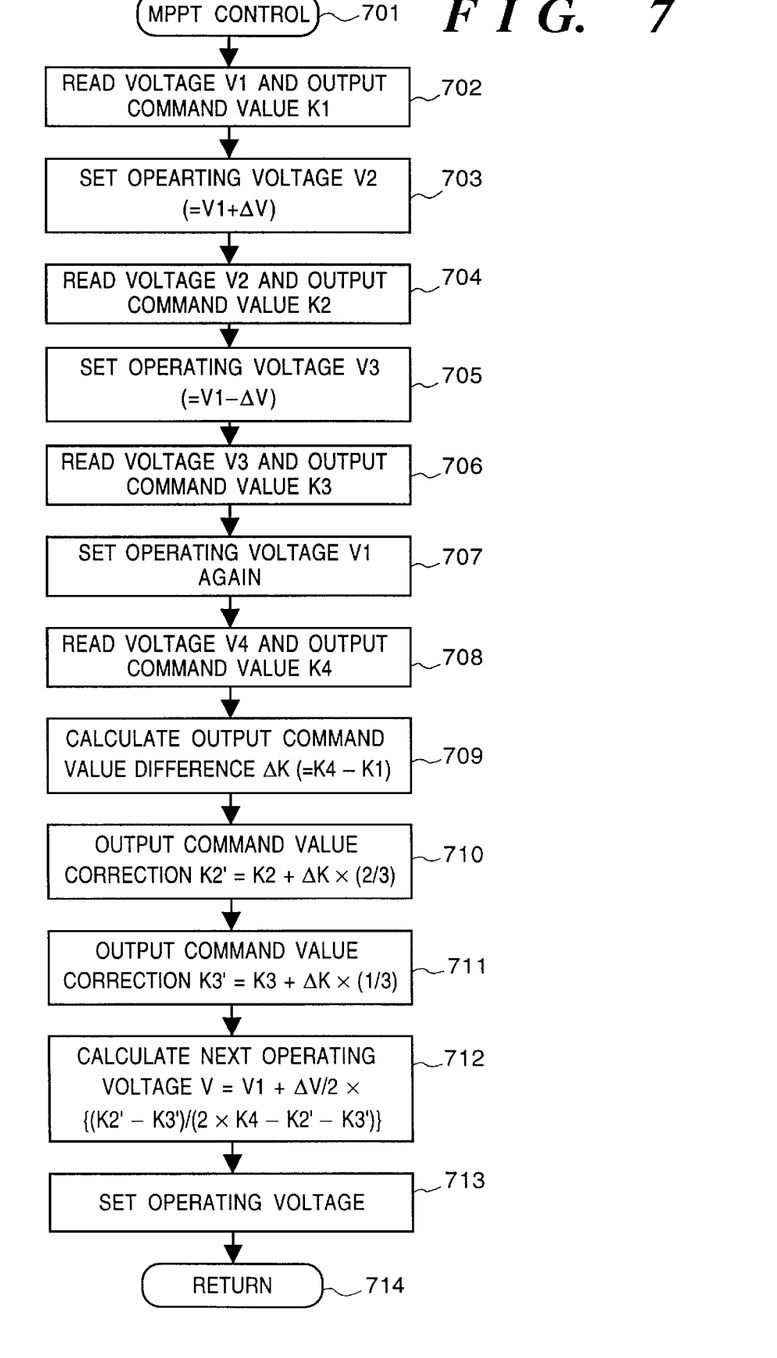
FIG. 7 is a flow chart showing a control operation in FIG. 6.

A solar power generation system using a power control method of the third embodiment has an arrangement as shown in FIG. 1, as in the first and second embodiments. A power control method different from those described above will be described below with reference to FIG. 6. FIG. 6 is a graph showing characteristic curves at various times, in which the output voltage from the solar cell is plotted along the abscissa, and the output command value is plotted along the ordinate. FIG. 7 is a flow chart showing an operation to be described below.

A set voltage is defined as V1 first. Control is performed by a voltage control means 5 such that the output voltage from a battery power supply 1 becomes the set voltage. At time t1, sampling is performed to fetch the output voltage V1 from the battery power supply 1 and an output command value K1 at an operating point ① (702).

operating point ①: voltage V1, output command value K1

Subsequently, a set voltage is defined as V2 (=V1+ΔV) (703). Control is performed by the voltage control means 5 such that the output voltage from the battery power supply 1 becomes the set voltage. At the next sampling time t2, (=t1+Ts), the output voltage V2 and an output command value K2 at an operating point ② are fetched (704).

operating point ②: voltage V2, output command value K2

A set voltage is defined as V3 (=V1−ΔV)) (705). Control is performed by the voltage control means 5 such that the output voltage from the battery power supply 1 becomes the set voltage. At the next sampling time t3, (=t2+Ts), the output voltage V3 and an output command value K3 at an operating point ③ are fetched (706).

operating point ③: voltage V3, output command value K3

The set voltage is defined as V1 again (707). The output voltage is controlled by the voltage control means 5. At the next sampling time t4 (=t3+Ts), an output voltage V4 (=V1) and an output command value K4 at an operating point ③ are fetched (708).

operating point ④: voltage V4, output command value K4

An output command value difference ΔK=(K4−K1) is calculated to estimate the variation in solar radiation on the basis of the difference between the output command values (K1 and K4) for the same voltage value V1 (=V4) (709). When the solar cell output voltage does not change, the variation in output power of the solar cell is almost proportional to the variation in solar radiation. The output power of a power conversion means 2 is almost proportional to the input power. In addition, the output command value is proportional to the output power of the power conversion means 2. For this reason, the variation in output command value is almost proportional to the variation in solar radiation. The output power and output command value of the power conversion means 2 are also almost proportional to the variation in solar radiation as far as the input power varies only for a short period corresponding to the sampling period. Therefore, the difference between the output command values for the same voltage is information representing the change amount of solar radiation for that period of time. That is, the difference between the output command values, i.e., $\Delta K = K4 - K1$ represents the change amount of solar radiation from time t1 to time t4.

Data is corrected using the difference $\Delta K$, i.e., information representing a change in solar radiation (710 and 711).

The normal sampling period Ts is as short as about 1/30 sec, so that the change rate of solar radiation from time t1 to time t4 can be regarded as constant. Near the operating point at which the maximum output can be obtained from the inverter, the difference between the output command values from the inverter for the voltages V1 and V2 or V3 is small. Therefore, the rate of change in output command value caused by the variation in solar radiation for a period corresponding to the sampling period Ts can be regarded as constant for the operating voltages V1 and V2 or V3.

To correct the output command value K2 for the voltage V2 at time t2 to an output command value K2' for the voltage V2 at time t4, an output command value $\Delta K \times (2/3)$, which corresponds to the change mount of solar radiation from time t2 to time t4, must be added to the output command value K2:

$$K2' = K2 + \Delta K \times (2/3)$$

This corrected operating point is indicated by ②' in FIG. 6.

operating point ②': voltage V2, output command value K2'

In addition, to correct the output command value K3 for the voltage V3 at time t3 to an output command value K3' for the voltage V3 at time t4, an output command value $\Delta K \times (1/3)$, which corresponds to the change mount of solar radiation from time t3 to time t4, must be added to the output command value K3:

$$K3' = K3 + \Delta K \times (1/3)$$

This corrected operating point is indicated by ③' in FIG. 6.

operating point ③': voltage V3, output command value K3'

The next operating voltage is determined on the basis of the data at the three operating points ②', ③', and ④ in the following manner.

The voltage vs. output command value characteristic curve at time t4 is approximated using a quadratic curve on the basis of the voltages and output command values at the operating points ②', ③', and ④. Normally, curve approximation within a small range can be satisfactorily achieved by a quadratic curve. In addition, since quadratic curve approximation is performed using data at the three points, the quadratic curve for approximation is uniquely defined. More specifically, substituting the set of voltages and output command values into an equation with coefficients $\underline{a}$, b, and c, i.e., $$K = aV^2 + bV + c$$

yields the following simultaneous equations with three unknowns:

$$K4 = aV1^2 + bV1 + c$$
$$K2' = aV2^2 + bV2 + c$$
$$K3' = aV2^2 + bV3 + c$$

By solving these equations, the coefficient $\underline{a}$, b, and c are obtained.

On this approximately obtained voltage vs. output command value characteristic curve, a voltage for which the output command value is maximized is selected. That is, a voltage exhibiting an extreme value on the approximated quadratic curve:

$$V = -b/2a$$

is set.

The voltage change width in the searching operation is constant, as is represented by:

$$(V2 - V1) = (V1 - V3) = \Delta V$$

As a result, the set voltage is represented by a simple equation:

$$V = V1 + \Delta V/2 \times \{(K2' - K3')/(2 \times K4 - K2' - K3')\}$$

The voltage is calculated in accordance with this equation (712) and set as a next search start voltage V (713).

By repeating the above operation (714), the operating point at which the maximum power can be supplied from the power conversion means 2 can be tracked.

A case wherein the light amount increases has been described above. However, as can be easily understood, even when the light amount decreases or does not change, the operating point at which the maximum power can be obtained is tracked.

As described above, when the variation in solar radiation is estimated on the basis of the output command values for the same voltage to correct the data, data represented by the same voltage vs. output command value characteristic curve at the same time can be obtained. On the basis of this data, the searching direction is determined. With this operation, control is performed such that the maximum power is supplied from the battery power supply 1 to a load 3 through the power conversion means 2 without any erroneous operation of the search control algorithm caused by the variation in solar radiation. The entire system is most efficiently operated, and an unstable operation of the system is controlled.

As described above, according to the present invention, in the power control method for the apparatus having the battery power supply, the power conversion means for converting power from the battery power supply and supplying the power to the load, the voltage setting means for setting the output voltage from the battery power supply, and the voltage control means for controlling the output command value to the power conversion means such that the voltage value of the battery power supply becomes the set voltage, comprising setting a voltage on the basis of the output command value or the output command value and the set voltage. With this arrangement, the following effects can be obtained.

(1) The output command value input to the power conversion unit is controlled to be maximized. With this operation, the maximum power is supplied from the power conversion unit to the load, so that the entire system is operated at the highest conversion efficiency.

(2) Since the output command value as a DC signal in the control system is used, the arrangement is simplified.

(3) As compared to calculation using an AC power value or an AC current value, the processing load is much smaller than that in calculation using an AC power value or an AC current value. For this reason, inexpensive parts can be used, resulting in a decrease in cost.

In addition, according to the present invention, the power control method for the apparatus having the battery power supply, the power conversion means for converting power from the battery power supply and supplying the power to the load, the voltage setting means for setting the output voltage from the battery power supply, and the voltage control means for controlling the output command value to the power conversion means such that the voltage value of the battery power supply becomes the set voltage comprises the steps of changing the output voltage from the battery power supply to fetch the output command value, calculating a fetching variation on the basis of a plurality of output command values for the same voltage, calculating a corrected output command value on the basis of the variation and the output command value, and setting the set voltage on the basis of the corrected output command value or the corrected output command value and the set voltage. With this arrangement, the following effects can also be obtained.

(4) The optimum operating point can be accurately searched without being influenced by the variation in solar radiation during the searching operation, so that the maximum power can be output from the power conversion unit.

(5) Since the optimum operating point can always be searched/tracked without being influenced by the variation in solar radiation, the system is stably operated.

(6) Particularly, when the sampling operation for the same voltage is performed twice, the number of sampling operations can be minimized, and the optimum operating point can be searched at a high speed.

(7) Particularly, when the sampling operation for the same voltage is performed at the start and end of the sampling operation, data can be further accurately corrected. Therefore, the operating point at which the output from the power conversion unit is maximized can be further accurately searched.

As has been described above, the power control method and the power control apparatus using this method of the present invention is very useful. Particularly, a very large effect can be provided for a battery power supply system connected to a commercial system.

As many apparently widely different embodiments of the present invention can be made without departing from the spirit and scope thereof, it is to be understood that the invention is not limited to the specific embodiments thereof except as defined in the appended claims.

What is claimed is:

1. A power control method for an apparatus having power conversion means for converting power from a battery power supply and supplying the power to a load, voltage setting means for setting an output voltage from said battery power supply, and voltage control means for controlling an output command value to said power conversion means such that a voltage value of said battery power supply becomes a set voltage, comprising calculating the set voltage to be subsequently set on the basis of the output command value for a first period and/or the set voltage for the first period.

2. The method according to claim 1, wherein the first period is a past or present period.

3. The method according to claim 1, wherein the set voltage is changed from the set voltage for the first period in an increasing or decreasing direction such that when the output command value at that time increases, the set voltage to be subsequently set is changed in the same direction, and when the output command value decreases, the set voltage to be subsequently set is changed in an opposite direction.

4. The method according to claim 1, further comprising the steps of changing the set voltage for said battery power supply from said set voltage for the first period a plurality of times to fetch m output command values and m output voltages, calculating a function with an extremum which approximates a relationship between the m output command values and the m output voltages, and obtaining a voltage for which the output command value is maximal and setting the voltage as the set voltage to be subsequently set.

5. The method according to claim 4, wherein the function with an extremum includes a quadratic function.

6. The method according to claim 4, wherein m is an integer of not less than 3.

7. The method according to claim 1, further comprising the steps of changing the set voltage for the first period to fetch the output command value after the set voltage is changed, calculating a variation in output command value caused by a fetching difference on the basis of a plurality of output command values for the same set voltage, calculating a corrected output command value on the basis of the variation and the output command values, and calculating/setting the set voltage to be subsequently set on the basis of the corrected output command value or the corrected output command value and the set voltage.

8. The method according to claim 7, wherein a fetching operation for the same set voltage is performed at least twice.

9. The method according to claim 7, wherein a fetching operation for the same set voltage is performed at the start and end of a series of set voltage searching operations for calculating the set voltage to be subsequently set.

10. The method according to claim 1, wherein a length of the first period is not more than $\frac{1}{30}$ second.

11. The method according to claim 1, further comprising the steps of changing the set voltage for the first period to change the output voltage from said battery power supply and fetch the output command value after the output voltage is changed, calculating a fetching variation on the basis of a plurality of output command values for the same set voltage, calculating a corrected output command value on the basis of the variation and the output command values, and when the corrected output command value at that time increases, changing the set voltage in the same direction, and when the output command value decreases, changing the set voltage in an opposite direction.

12. The method according to claim 1, further comprising the steps of changing the set voltage for the first period to change the output voltage from said battery power supply and fetch the output command value after the output voltage is changed, calculating a variation in output command value caused by a fetching difference on the basis of a plurality of output command values for the same set voltage, calculating a corrected output command value on the basis of the variation and the output command values, calculating a function with an extremum which approximates a relationship between the corrected output command value and the set voltage, and obtaining, from the function with an extremum, a voltage for which the output command value is maximal and setting the voltage as the set voltage.

13. The method according to claim 12, wherein the function with an extremum includes a quadratic function.

14. The method according to claim 1, further comparing the steps of reading an output command value K1 and a set voltage V1 for the first period, and comprising an output command value K2 for a second period with the output command value K1.

15. The method according to claim 14, wherein the set voltage is changed in accordance with a magnitude relationship between the output command values K1 and K2.

16. The method according to claim 15, wherein, when the output command value satisfies K1>K2, the set voltage is changed in a decreasing direction.

17. A power control apparatus having power conversion means for converting power from a battery power supply and supplying the power to a load, voltage setting means for setting an output voltage from said battery power supply, and voltage control means for controlling an output command value to said power conversion means such that a voltage value of said battery power supply becomes a set voltage, wherein said voltage setting means has a function of calculating the set voltage to be subsequently set on the basis of the output command value for a first period and/or the set voltage for the first period.

18. The apparatus according to claim 17, wherein said voltage setting means has a function of changing the set voltage in an increasing or decreasing direction such that when the output command value at that time increases, the set voltage is changed in the same direction, and when the output command value decreases, the set voltage is changed in an opposite direction.

19. The apparatus according to claim 17, wherein said voltage setting means has a function of changing the set voltage to sample m output command values and m corresponding set voltages, and obtaining, from a function with an extremum which approximates a relationship between the m output command values and the m set voltages, a voltage for which the output command value is maximal to calculate the set voltage to be subsequently set.

20. The apparatus according to claim 17, wherein said voltage setting means changes the set voltage to change the output voltage from said battery power supply and sample the output command value after the output voltage is changed, calculates a variation in output command value caused by a fetching difference on the basis of a plurality of output command values for the same set voltage, calculates a corrected output command value on the basis of the variation and the output command values, and calculates the set voltage to be subsequently set on the basis of the corrected output command value or the corrected output command value and the set voltage.

21. The apparatus according to claim 20, wherein a sampling operation for the same set voltage is performed at least twice.

22. The apparatus according to claim 20, wherein a sampling operation for the same set voltage is performed at the start and end of a series of sampling operations for obtaining the corrected output command value.

23. The apparatus according to claim 17, wherein said voltage setting means has a function of changing the set voltage to change the output voltage from said battery power supply and sample the output command value after the output voltage is changed, calculating a variation in output command value caused by a sampling difference on the basis of a plurality of output command values for the same set voltage, calculating a corrected output command value on the basis of the variation and the output command values, and when the corrected output command value at that time increases, changing the set voltage in the same direction, and when the output command value decreases, changing the set voltage in an opposite direction.

24. The apparatus according to claim 17, wherein said voltage setting means has a function of changing the set voltage to change the output voltage from said battery power supply and sample the output command value after the output voltage is changed, calculating a variation in output command value caused by a fetching difference on the basis of a plurality of output command values for the same set voltage, calculating a corrected output command value on the basis of the variation and the output command values, and obtaining, from a function with an extremum which approximates a relationship between the corrected output command values and the set voltages, a voltage for which the output command value is maximal to obtain the set voltage to be subsequently set.

25. A battery power supply system having a battery power supply, power conversion means for converting power from said battery power supply and supplying the power to a load, voltage setting means for setting an output voltage from said battery power supply, and voltage control means for controlling an output command value to said power conversion means such that a voltage value of said battery power supply becomes a set voltage, wherein said voltage setting means calculates and sets the set voltage on the basis of the output command value and the set voltage.

26. The system according to claim 25, wherein said voltage setting means changes the set voltage in an increasing or decreasing direction such that when the output command value at that time increases, the set voltage is changed in the same direction, and when the output command value decreases, the set voltage is changed in an opposite direction.

27. The system according to claim 26, wherein said battery power supply includes a solar cell.

28. The system according to claim 27, wherein said solar cell contains at least one selected from the group consisting of a non-monocrystalline silicon semiconductor, a monocrystalline silicon semiconductor, and a compound semiconductor.

29. The system according to claim 25, wherein said voltage setting means changes the output voltage from said battery power supply to sample m output command values and m set voltages, calculates a function with an extremum which approximates a relationship between the m output command values and the m set voltages, and obtains, from the function of an extremum, a voltage for which the output command value is maximal, and sets the voltage as the set voltage to be subsequently set.

30. The system according to claim 29, wherein said battery power supply includes a solar cell.

31. The system according to claim 30, wherein said solar cell contains at least one selected from the group consisting of a non-monocrystalline silicon semiconductor, a monocrystalline silicon semiconductor, and a compound semiconductor.

32. The system according to claim 25, wherein said voltage setting means changes the output voltage from said battery power supply to sample the output command value, calculates a reception variation on the basis of a plurality of output command values for the same set voltage, calculates a corrected output command value on the basis of the variation and the output command values, and calculates and sets the set voltage on the basis of the corrected output command value or the corrected output command value and the set voltage.

33. The system according to claim 32, wherein a sampling operation for the same set voltage is performed at least twice.

34. The system according to claim 32, wherein a sampling operation for the same set voltage is performed at the start and end of sampling operations.

35. The system according to claim 32, wherein said battery power supply includes a solar cell.

36. The system according to claim 35, wherein said solar cell contains at least one selected from the group consisting of a non-monocrystalline silicon semiconductor, a monocrystalline silicon semiconductor, and a compound semiconductor.

37. The system according to claim 25, wherein said voltage setting means changes the output voltage from said battery power supply to sample the output command value, calculates a sampling variation on the basis of a plurality of output command values for the same set voltage, and when the corrected output command value on the basis of the sampling variation increases, changes the set voltage in the same direction, and when the output command value decreases, changes the set voltage in an opposite direction.

38. The system according to claim 37, wherein said battery power supply includes a solar cell.

39. The system according to claim 38, wherein said solar cell contains at least one selected from the group consisting of a non-monocrystalline silicon semiconductor, a monocrystalline silicon semiconductor, and a compound semiconductor.

40. The system according to claim 25, wherein said voltage setting means changes the output voltage from said battery power supply to sample the output command value, calculates a fetching variation on the basis of a plurality of output command values for the same set voltage, calculates a corrected output command value on the basis of the variation and the output command value, calculates a function with an extremum which approximates a relationship between the corrected output command value and the set voltage, and obtains a voltage for which the output command value is maximal and sets the voltage as the set voltage.

41. The system according to claim 40, wherein said battery power supply includes a solar cell.

42. The system according to claim 41, wherein said solar cell contains at least one selected from the group consisting of a non-monocrystalline silicon semiconductor, a monocrystalline silicon semiconductor, and a compound semiconductor.

43. The system according to claim 25, wherein said battery power supply includes a solar cell.

44. The system according to claim 43, wherein said solar cell contains at least one selected from the group consisting of a non-monocrystalline silicon semiconductor, a monocrystalline silicon semiconductor, and a compound semiconductor.

* * * * *

UNITED STATES PATENT AND TRADEMARK OFFICE
CERTIFICATE OF CORRECTION

PATENT NO. : 5,838,148
DATED : November 17, 1998
INVENTOR(S): SEIJI KUROKAMI, ET. AL It is certified that error appears in the above-identified patent and that said Letters Patent is hereby corrected as shown below:

ON TITLE PAGE AT [56] FOREIGN PATENT DOCUMENTS

"6110571" should read --6-110571--; and
"6054452" should read --6-054452--.

COLUMN 7

Line 11, "$\Delta K=K3=K1$" should read --$\Delta K=K3-K1$--.
Line 37, "$K2'$The" should read --$K2'$ ¶ The--.

COLUMN 9

Line 30, "$K3,$" should read --$K3'$--.

Signed and Sealed this

Twentieth Day of June, 2000

*Attest:*

Q. TODD DICKINSON

*Attesting Officer*     *Director of Patents and Trademarks*